UNITED STATES PATENT OFFICE.

JOHN D. HEINS, OF NEW YORK, N. Y.

BIRD-FOOD.

SPECIFICATION forming part of Letters Patent No. 365,995, dated July 5, 1887.

Application filed February 17, 1885. Serial No. 156,158. (No specimens.)

*To all whom it may concern:*

Be it known that I, JOHN D. HEINS, of the city, county, and State of New York, have invented a new and Improved Bird-Food, of which the following is a full, clear, and exact description.

The object of my invention is to provide a new and wholesome food for birds, containing egg, that will keep and can be put up in small boxes or packages, and sold upon the market.

In making my new bird-food I take one pound of egg boiled nearly hard, and to this I add one-quarter of a pound of some baked or unbaked farinaceous substance—baked soda crackers preferred. I then crush and thoroughly mix these ingredients, and then dry or bake them with a slow heat, stirring the ingredients at intervals while drying. After the moisture is sufficiently evaporated from the mixture, it should be thoroughly agitated or stirred. This will granulate the mixture, so that it will be very light, and it can be put up in boxes and kept for a long time in a perfect, sweet, and wholesome state.

Having thus described my invention, what I claim as new, and desire to secure by Letters Patent, is—

As a new article of manufacture, the prepared bird-food herein described, which consists of the whites and yelks of boiled eggs and pulverized farinaceous substance mixed and baked together and granulated, substantially as described.

JOHN D. HEINS.

Witnesses:
  H. A. WEST,
  C. SEDGWICK.